United States Patent [19]
Keijzer et al.

[11] 3,874,487
[45] Apr. 1, 1975

[54] SHOCK ABSORBER

[75] Inventors: Johan H. Keijzer; Johan V. van den Berg, both of Hasselt; Jan M. A. Wijnhoven; Louis J. Jossa; August G. L. Moonen, all of Sint-Truiden, all of Belgium

[73] Assignee: Monroe Belgium N.V., Sint-Truiden, Belgium

[22] Filed: June 14, 1973

[21] Appl. No.: 370,021

[52] U.S. Cl............. 188/322, 188/315, 137/614.18
[51] Int. Cl............................................. F16f 9/34
[58] Field of Search .......... 188/322, 280, 282, 315; 137/614.18, 516.27

[56] References Cited
UNITED STATES PATENTS

| | | | |
|---|---|---|---|
| 2,403,648 | 7/1946 | Focht.................................. | 188/280 |
| 2,653,682 | 9/1953 | Whisler, Jr. et al. ............... | 188/282 |
| 2,697,496 | 12/1954 | McIntyre ............................ | 188/280 |
| 2,717,058 | 9/1955 | Briendrett.......................... | 188/322 |
| 3,007,550 | 11/1961 | Long, Jr............................. | 188/280 |
| 3,302,756 | 2/1967 | McIntyre ........................... | 188/322 |
| 3,519,109 | 7/1970 | Whisler, Jr........................ | 188/282 |

FOREIGN PATENTS OR APPLICATIONS

| | | | |
|---|---|---|---|
| 507,787 | 11/1954 | Canada.............................. | 188/322 |

Primary Examiner—Trygve M. Blix
Assistant Examiner—Edward R. Kazenske
Attorney, Agent, or Firm—Harness, Dickey & Pierce

[57] ABSTRACT

A compression or base valve for a shock absorber including concentrically oriented pressure and reserve cylinders defining a fluid reservoir therebetween, with the pressure cylinder having a reciprocally disposed piston therein; the compression valve being located at the lower end of the pressure cylinder and adapted to selectively communicate fluid between the pressure cylinder and the fluid reservoir; the valve including a base member extending across the lower end of the pressure cylinder and defining a central opening and a plurality of circumferentially spaced passages arranged concentrically of the central opening, a first valve member mounted above the base member and adapted to selectively close the plurality of fluid passages and a second valve member carried on a relief valve reciprocally disposed below the base member, the second valve member being movable to a first position response to low fluid pressure flowing from the pressure cylinder to the fluid reservoir and being movable to a second position in response to movement of the relief valve when relatively higher pressure fluid is communicated from the pressure cylinder to the fluid reservoir.

20 Claims, 5 Drawing Figures

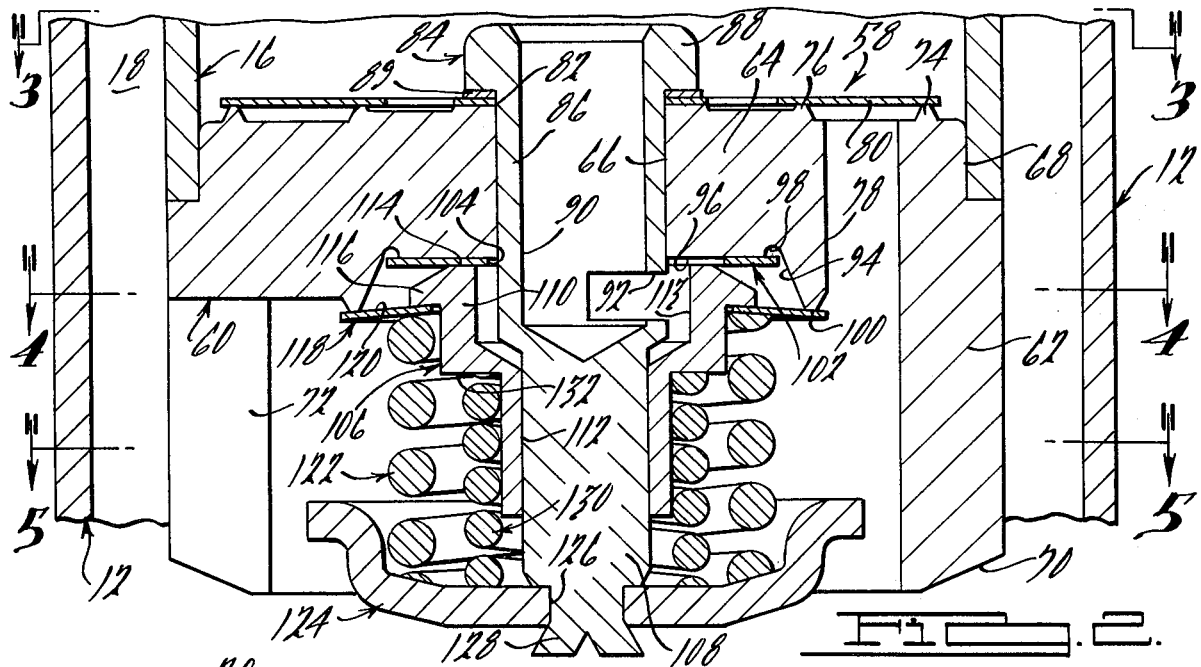
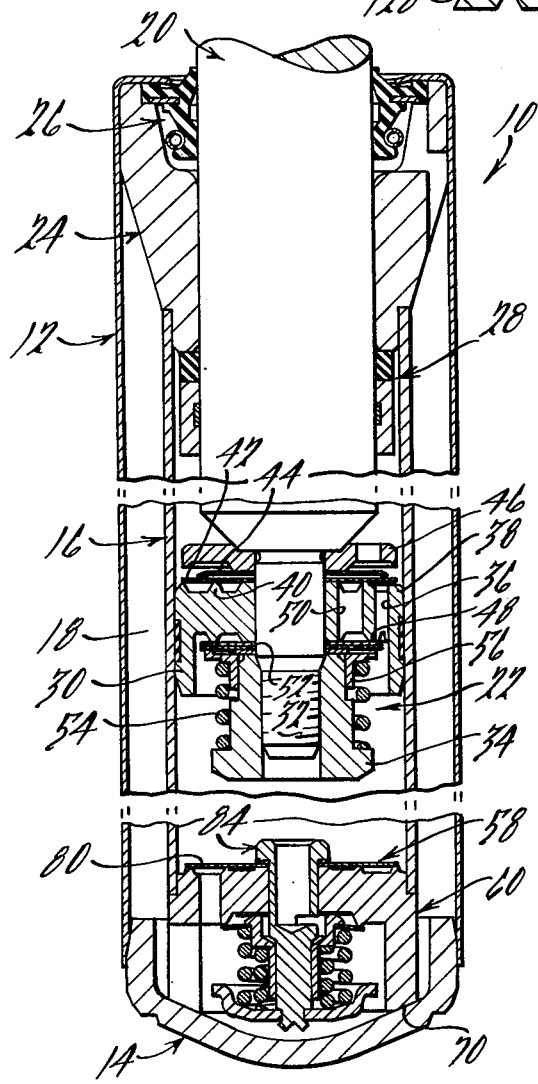
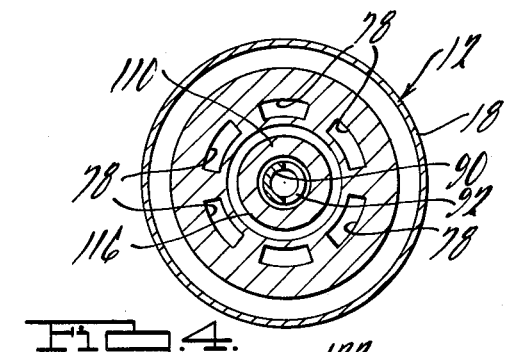
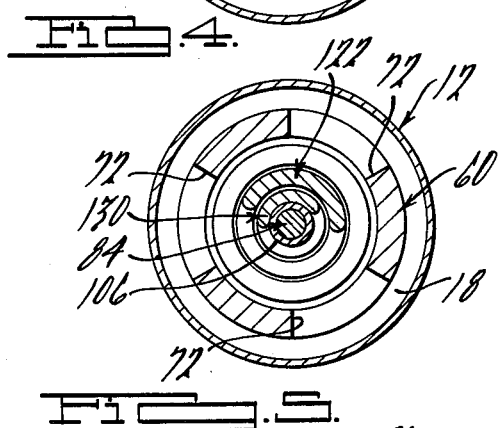
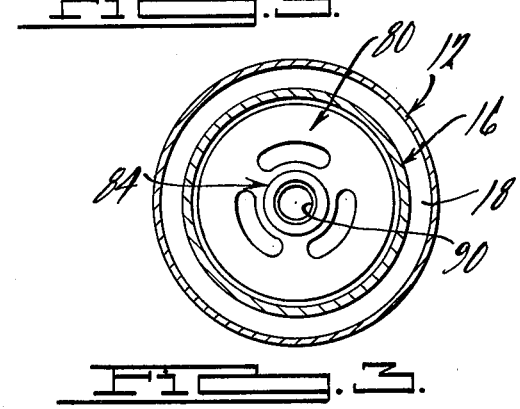

SHOCK ABSORBER

SUMMARY OF THE INVENTION

The present invention is generally directed toward a new and improved compression or base valve for use in hydraulic shock absorbers of the type having a fluid reservoir or reserve located around the outer periphery of a pressure cylinder within which the shock absorber piston is reciprocally disposed. More particularly, the present invention is directed toward a new and improved compression or base valve of the above described type that is particularly adapted for use in shock absorbers of the McPherson type which are adapted to be removably disposed within an associated support structure. As will be appreciated by those skilled in the art, such McPherson type shock absorber units require that the compression valve not have an open orifice due to the fact that such open orifices lead to an equal oil level in the pressure cylinder and the fluid reservoir when the associated vehicle has been inoperative for an extended period of time. When this occurs, atmospheric air enters into the upper portion of the pressure cylinder and it is necessary that such air be "primed out" during the initial operational cycles of the shock absorber. This characteristic is particularly serious in connection with McPherson type units in that it results in the rod guide that reciprocally supports the piston rod at the upper end of the unit having very little lubrication during the priming period, which in turn leads to rapid wear due to the high side or lateral loads that such units are normally subjected to.

It has heretofore been the practice in the design of compression valves for use in McPherson shock absorber units to utilize disc type valving for both the normal functioning of the compression valve and also for the closed bleed; however, considerable objection has resulted from the fact that such disc type valving has a relatively short operational life. In the present invention, the valving is accomplished by means of a conventional helical coil spring, the advantages of which have long been experienced by virtually all shock absorber manufacturers, which coil spring is cooperable with a unique disc valve arrangement that functions to close the bleed orifice, yet is subjected to very little fatigue and hence will have a long and effective operational life. Accordingly, the compression valve of the present invention will be found to overcome the many objectionable characteristics of similar type valves heretobefore known and used in the prior art, as will hereinafter be described in detail.

It is accordingly a general object of the present invention to provide a new and improved shock absorber construction.

It is a more particular object of the present invention to provide a new and improved compression or base valve for shock absorbers of the McPherson type.

It is still a more particular object of the present invention to provide a new and improved compression valve of the above described type which utilizes a unique coil spring and valve disc for accomplishing the valving function therein.

It is yet another object of the present invention to provide a new and improved compression valve which is of relatively simple design, is economical to manufacture and which will have a long and effective operational life.

Other objects and advantages of the present invention will become apparent from the following detailed description taken in conjunction with the accompanying drawing.

BRIEF DESCRIPTION OF THE DRAWINGS

FIG. 1 is a longitudinal cross sectional view of a shock absorber assembly incorporating the new and improved compression valve of the present invention;

FIG. 2 is an enlarged cross sectional view of the compression valve illustrated in FIG. 1;

FIG. 3 is a transverse cross sectional view taken substantially along the line 3—3 of FIG. 2;

FIG. 4 is a transverse cross sectional view taken substantially along the line 4—4 of FIG. 2; and FIG. 5 is a transverse cross sectional view taken substantially along the line 5—5 of FIG. 2.

DESCRIPTION OF THE PREFERRED EMBODIMENT

Referring now in detail to the drawing and in particular to FIG. 1 thereof, a shock absorber assembly 10 is shown as comprising an elongated cylindrical housing 12 which is closed at the lower end thereof by a generally cup-shaped end cap member 14. Disposed within the housing 12 and extending co-axially thereof is an elongated tubular pressure cylinder 16 which defines with the housing 12 a generally annular fluid chamber or reservoir 18. An elongated piston rod 20 extends co-axially within the pressure cylinder 16 and is adapted to support a piston assembly 22 on the lower end thereof. The piston rod 20 is mounted for reciprocal movement within the assembly 10 by means of an annular rod guide 24 which is disposed adjacent the upper ends of the housing 12 and pressure cylinder 16. A suitable fluid seal assembly 26 is disposed within the upper end of the rod guide 24 and is adapted to provide a fluid-tight seal around the outer periphery of the piston rod 20. A rebound bumper assembly 28 is disposed below the rod guide 24 and is adapted to function in a manner well known in the art in preventing damage to the piston assembly 22 during the rebound cycle of the assembly 10. The entire shock absorber assembly 10 is adapted to be removably mounted within a suitable housing or support structure (not shown) which is interposed between, and dampen relative movement of the sprung and unsprung portions of a vehicle, whereby the piston rod 20 is adapted to be operatively associated with the sprung portion of the vehicle and the assemblage consisting of the housing 12 and pressure cylinder 16 are adapted to be operatively associated with the unsprung portion of the vehicle, as will be appreciated by those skilled in the art who are acquainted with McPherson type shock absorber units.

The piston assembly 22 comprises a generally cylindrically shaped piston member 30 which is operatively supported on a reduced diameter lower end portion 32 of the piston rod 20 by means of a suitable retaining nut 34. The piston member 30 is provided with a plurality of circumferentially spaced radially outermost disposed set of longitudinally extending apertures 36 which are located between a pair of radially spaced, concentric valve seats 38 and 40 that are provided on the upper end of the member 30. The valve seats 38, 40 are cooperable with and adapted to be engaged by a relatively thin, washer-like valve element 42 which functions to close the upper ends of the apertures 36 when the piston rod 20 moves upwardly within the pressure cylinder 16. A spring disc 44 is disposed directly above the valve element 42 and is adapted to resiliently urge the latter toward the valve seats 38, 40. A support washer 46 is disposed directly above the spring disc 44 for the purposes of securing the spring 44 and valve disc 42 in place.

Another annular valve seat 48 is provided on the lower end of the piston member 30 at a position radially outwardly of a plurality of circumferentially spaced, longitudinally extending inner set of apertures 50 and is adapted to be engaged by a thin washer-like valve disc 52 which is urged against the valve seat 48 by means of a helical coil spring 54, the upper end of which bears against a spring seat 56 and the lower end of which bears against the nut 34. It will be seen that when the piston assembly 22 is moved upwardly within the pressure cylinder 16, fluid under pressure will move downwardly through the apertures 50, thereby unseating the valve disc 52 and permitting the fluid to pass into the area below the piston assembly 22. Similarly, when the piston assembly 22 moves downwardly within the pressure cylinder 16, the valve disc 42 will move upwardly away from the valve seats 38, 40 to permit fluid to move into the upper end of the pressure cylinder 16, as will be appreciated by those skilled in the art.

In accordance with the principles of the present invention, the shock absorber assembly 10 is provided with a new and improved compression valve assembly, generally designated by the numeral 58, which comprises a cylindrical end or base member 60 which is of a generally cup-shaped configuration and comprises annular side wall section 62 that terminates at the upper end thereof in a generally circular upper or top section 64 having a central annular aperture 66. An annular recess 68 is formed around the outer periphery of the member 60 adjacent the upper end thereof and is adapted to receive and be fixedly secured to the lower end of the pressure cylinder 16. As best shown in FIG. 2, the radially outermost lower edge of the section 62 is chamfered or tapered, as seen at 70, and is adpated to be supported upon the upper side of the end cap 14. The side wall section 62 of the member 60 is formed with a plurality (preferably three) of circumferentially extending radially disposed slots 72 which communicate interior of the valve assembly 58 with the lower end of the fluid chamber 18.

The upper side of the top section 64 of the member 60 is formed with a pair of concentrically oriented, upwardly extending annular valve seats 74 and 76 between which are disposed a plurality of circumferentially spaced, longitudinally extending flow ports or passages 78. The valve seats 74, 76 are cooperable with and adapted to be engaged to a generally circular valve disc 80 which is formed with a central annular opening 82. Extending co-axially of the member 60 is a generally cylindrically shaped valve pin 84 which comprises a body 86 and an enlarged diameter head section 88. As shown in FIG. 2, the valve pin 84 extends downwardly through the opening 82 in the valve disc 80 and also downwardly through the central aperture 66 in a member 60. The head section 88 of the valve pin 84 extends radially outwardly over the periphery of the opening 82 and a suitable annular spacer element 89 or the like is preferably provided between the lower side of the head section 88 and the upper side of the valve disc 80.

The reason for the spacer 89 is that since the valve 80 is designed to fit closely around the outer periphery of the valve pin 84 in order to provide for optimum centering of the valve 80 on the valve seat 74, the spacer 89 assures against any interference between the upper side of the valve 80 and the head section 88 of the valve pin 84.

In the above described configuration, it will be seen that the radially outermost portion of the valve disc 80 is intended to close the upper ends of the flow ports 78 when the disc 80 is engaged with the valve seats 74, 76; however, at such time as the radially outermost portion of the valve disc 80 moves upwardly away from the seats 74, 76 under the influence of a differential pressure between the reservoir 18 and the interior of the pressure cylinder 16, the upper ends of the ports 78 will be opened to provide for fluid flow therethrough. The valve 80 is designed so as to be extremely light weight as compared to comparable valves heretofore known and used in the prior art, whereby to assure for rapid response time and less hydraulic and mechanical noise. It may be noted that for certain applications, the valve 80 may be cooperable with a conventional "star type" valve spring for positively engaging the underside of the valve 80 with the valve seats 72 and 74, although it is contemplated that such springs would not be normally necessary for satisfactory operation of the compression valve assembly 58. The upper end of the valve pin 84 is formed with a downwardly extending bore 90, the upper end of which communicates with the interior of the pressure cylinder 16 and the lower end of which is communicable with a generally radially disposed passage 92 that is in turn communicable with the underside of the end member 60 and hence with the fluid chamber 18 via the plurality of slots 72, for purposes hereinafter to be described.

The underside of the top section 64 of the cylindrical end member 60 is formed with an annular recess 94 around the lower end of the opening 66. The recess 94 is defined in part by the generally radially extending flat surface 96 which terminates at its radially outer edge in an upwardly directed undercut portion 98, with a downwardly projecting annular valve seat 100 being formed on the lower side of the section 64 circumjacent the outer periphery of the recess 94, as illustrated. Disposed adjacent the surface 96 is an annular orifice disc 102 which is formed with a restricted orifice or passage defining opening 104 which is aligned with the opening 66 in the end member 60 and through which the valve pin 84 extends, as illustrated. Disposed directly below the orifice disc 102 is a generally sleeve-shaped relief valve member 106 that includes a generally cylindrical lower end section 108 and an enlarged diameter upper end section 110. The relief valve member 106 defines an axially extending cylindrical central bore 112 that is adapted to slidably receive the lower end of the valve pin 84, with the upper end section 110 defining a generally cup-shaped chamber 113 which is communicable with the bore 90 via the passage 92. The upper end of the valve member 106 defines a generally radially extending flat surface 114 adapted for engagement with the underside of the orifice disc, and the upper end of the member 106 also defines a generally radially outwardly extending shoulder 116, the underside of which is adapted to engage the upper side of a generally washer-like valve element 118. The outer periphery of the element 118 is adapted for engagement with the valve seat 100, as will hereinafter be described.

The upper side 120 of the valve element 118 is normally maintained in engagement with the valve seat 100 and the underside of the shoulder 116 by means of a helical coil spring 122 which extends co-axially of the lower end of the valve pin 84, with the result that the valve element 118 normally blocks fluid flow from the interior of the chamber 113 and the fluid chamber 18. The lower end of the spring 122 bears upon and is supported by a generally cup-shaped spring seat member 124 formed with a central opening 126 through which a lower end portion 128 of the valve pin 84 extends and is swaged or otherwise deformed whereby to fixedly secure the spring seat to the pin 84. A second helical coil spring 130 which is slightly smaller in diameter than the aforedescribed spring 122 is disposed radially inwardly thereof and is supported at the lower end thereof by means of the aforedescribed spring seat 124, the upper end of the spring 130 bearing against a generally radially outwardly extending shoulder 132 formed on the relief valve member 106, for purposes hereinafter to be described.

In operation, the shock absorber assembly 10 is adapted to function, generally, in the usual manner, with upward movement of the piston assembly 22 directing fluid through the plurality of ports 50, past the valve element 52 and into the lower portion of the pressure cylinder 16. Upon downward movement of the piston rod 20, the fluid in the lower portion of the cylinder 16 will pass upwardly through the plurality of ports 36 and past the valve element 42 into the upper portion of the cylinder 16. The valves 80, and 118 normally assume the position shown in FIGS. 1 and 2, wherein the lower surface of valve element 80 engages the valve seats 74, 76 to close the upper end of the passages 78, and the upper surface of the valve element 118 engaging the valve seat 100 and the lower side of the shoulder 116 to block fluid flow between the chamber 113 and the fluid reservoir 18. When additional fluid is required to fill the volume within the cylinder 16 below the piston assembly 22 due to the differential on the volume of the cylinder 16 above and below the piston assembly 22, the outer periphery of the valve element 80 will move upwardly away from the valve seats 74, 76 to effect opening of the upper ends of the passages 78, whereby fluid may flow from the reservoir 18, through the plurality of slots 72 and passages 78 into the lower end of the pressure cylinder 16.

Due to the volume of the piston rod 20 within the upper portion of the pressure cylinder 16, pressure will build up within the lower portion of the cylinder 16 as the piston assembly 22 moves downwardly during a compression stroke. When this occurs low pressure fluid will pass downwardly through the bore 90 in the valve pin 84 and thereafter radially outwardly through the slot 92. This fluid then passes upwardly through the orifice defined by the opening 104 in the disc 102, and thereafter, this fluid will pass downwardly into the recess 94 and will cause the valve element 118 to be biased downwardly away from the valve seat 100 against the resistance of the spring 122. The fluid will then pass between the valve 118 and seat 100 and then into the reservoir 18 via the slots 60. At higher compression speeds, the fluid will enter the chamber 113 in the same manner, i.e., through the bore 90 and slot 92, however, due to the higher pressure of the fluid, the entire relief valve member 106 is biased downwardly away from the orifice disc 102, thereby causing the valve element 118 to move away from the valve seat 100. It will be noted that as the relief valve member 106 moves downwardly, it does so against the resistance of both the spring 122 and the spring 130, whereby the fluid within the lower most part of the pressure cylinder 16 may pass downwardly through the bore 90, passage 92, chamber 113 and into the interior of the member 60, whereby such fluid may pass through the plurality of slots 72 into the fluid reservoir 18.

A particular feature of the present invention resides in the fact that the valve member 118 will be exposed to extremely little fatigue, i.e., the element is not subjected to "flexing", and thus will have a long and effective operational life. The reason for this is that the only deflection which the valve element 118 will be subjected to results from the tolerances of the various component parts of the valve assembly 58. It may be noted that the valve seat 100 is designed so as to extend downwardly relative to the normal position of the shoulder 116 of the relief valve 106 so as to assure for positive engagement of the upper side 120 of the valve member 118 with the valve seat 100.

It may be noted that although the compression valve 58 of the present invention has been described as being particularly applicable for use in shock absorbers of the McPherson type, the principles of the present invention are in no way intended to be limited to this specific application, since the various features and advantages of the compression valve 58 of the present invention may be incorporated in various other type of shock absorber designs, as will be appreciated by those skilled in the art.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A compression valve for a shock absorber including a pressure cylinder having a reciprocable piston therein and a reserve tube arranged concentrically of the pressure cylinder and defining a fluid reservoir therewith, said valve including a base member disposed adjacent one end of said pressure cylinder, said base member comprising first and second passage means communicating said reservoir with said pressure cylinder, means defining first and second valve seats on said base member, a first annular valve disc adjacent one side of said base member and having a deformable peripheral portion movable toward and away from engagement with said first valve seat to selectively block fluid flow from said pressure cylinder to said reservoir through said first passage means, a second annular valve disc concentrically arranged relative to said first disc and disposed adjacent the opposite side of said base member and movable toward and away from engagement with said second valve seat to selectively block fluid flow from said reservoir to said pressure cylinder, axially movable support means supporting said second valve disc and being movable axially therewith toward and away from said second valve seat, a pair of cooperable spring elements yieldably urging said means supporting said second valve disc toward a position wherein said second valve disc is engaged with said second valve seat, with one of said spring elements being deformable to permit only a peripheral portion of said second valve disc to move away from said second valve seat under the influence of a first magnitude of fluid pressure in said pressure cylinder, and with both of said spring elements being deformable to permit said second valve disc and said means supporting the same to move axially away from said second valve seat under the influence of a second magnitude of fluid pressure in said pressure cylinder.

2. A compression valve as set forth in claim 1 wherein said base member is of a generally cup-shaped configuration and comprises a generally circular top section having a downwardly extending annular side section.

3. A compression valve as set forth in claim 2 wherein said first passage means comprises a plurality of flow ports formed in said top section of said base member.

4. A compression valve as set forth in claim 3 wherein said second passage means comprises a central opening formed in said top section of said base member and wherein said flow ports are circumferentially spaced around said opening.

5. A compression valve as set forth in claim 4 which includes a plurality of circumferentially spaced slots formed in said side section of said base member and adapted to communicate said fluid reservoir with said first and second passage means.

6. A compression valve as set forth in claim 4 wherein said first valve seat extends circumferentially around the upper side of said base member circumjacent said ports.

7. A compression valve as set forth in claim 6 wherein said first valve seat comprises radially spaced, concentrically oriented inner and outer valve seat sections arranged radially inwardly and outwardly of said ports.

8. A compression valve as set forth in claim 4 wherein said second valve seat is disposed on the under side of said top sections of said base member and arranged radially inwardly from said ports.

9. A compression valve as set forth in claim 4 wherein said first valve disc is operatively secured to the upper side of said top section of said base member and comprises an outer peripheral portion movable toward and away from engagement with said first valve seat for selectively closing said ports.

10. A compression valve as set forth in claim 1 wherein said means supporting said second valve disc for axial movement toward and away from said second valve seat comprises a sleeve-like valve member axially slidably movable relative to said base member.

11. A compression valve as set forth in claim 1 wherein one of said spring elements comprises a helical coil spring.

12. A compression valve as set forth in claim 1 wherein said spring elements comprise first and second helical coil springs arranged concentrically of one another and disposed below said second valve seat.

13. A compression valve as set forth in claim 4 which includes a valve pin extending axially downwardly from said base member and defining a fluid passage communicating said central opening with the underside of said base member.

14. A compression valve as set forth in claim 13 which includes a pair of concentrically oriented helical coil springs disposed below the under side of said top section of said base member and supported at the lower ends thereof by said valve pin.

15. A compression valve as set forth in claim 14 which includes a relief valve member axially slidably supported on said valve pin.

16. A compression valve as set forth in claim 15 wherein one of said helical springs is operable to resiliently bias said relief valve member toward a position restricting fluid flow through said passage, and wherein the other of said helical springs is operable to urge said second valve disc toward engagement with said second valve seat.

17. A compression valve as set forth in claim 16 which includes means cooperable with said relief valve member defining a restricted flow orifice for controlling fluid flow between the upper side of said base member and said second valve disc.

18. A compression valve as set forth in claim 1 wherein said base member is of a generally cup-shaped configuration and comprises a generally circular top section having a downwardly extending annular side section, wherein said first passage means comprises a plurality of flow ports formed in said top section of said base member, wherein said second passage means comprises a central opening formed in said top section of said base member, and which includes a plurality of circumferentially spaced slots formed in said side section of said base member and adapted to communicate said fluid reservoir with said first and second passage means.

19. A compression valve as set forth in claim 18 wherein said first valve seat extends circumferentially around the upper side of said base member circumjacent said ports and comprises radially spaced, concentrically oriented inner and outer valve seat sections, wherein said second valve seat is disposed on the under side of said top section of said base member and arranged radially inwardly from said ports.

20. A compression valve as set forth in claim 19 which includes a valve pin extending axially through said central opening and defines in part a fluid passage from the upper side of said base member to the under side thereof, which includes a pair of concentrically oriented helical coil springs disposed below the underside of said top section of said base member and supported at the lower ends thereof by said valve pin, which includes a relief valve member axially slidably supported on said valve pin, one of said helical springs being operable to resiliently bias said relief valve member toward a position restricting fluid flow from said passage toward said second valve disc, and the other of said helical springs being operable to urge said second valve through toward engagement with said second valve seat, and which includes an orifice disc cooperable with said relief valve member defining a restricted flow orifice for controlling fluid flow between the upper side of said base member and said second valve disc.

* * * * *

UNITED STATES PATENT OFFICE
CERTIFICATE OF CORRECTION

PATENT NO. : 3,874,487
DATED : April 1, 1975
INVENTOR(S) : Johan H. Keijzer et al It is certified that error appears in the above-identified patent and that said Letters Patent are hereby corrected as shown below:

Inventor "Johan V. van den Berg" should be --Johan H. van den Berg--. In the Abstract, line 6, "adapated" should be --adapted--. Column 3, line 54, "to" second occurrence, should be --by--.

Signed and Sealed this twenty-third Day of September 1975

[SEAL]

Attest:

RUTH C. MASON
Attesting Officer

C. MARSHALL DANN
Commissioner of Patents and Trademarks